June 29, 1965 G. STARRE ETAL 3,191,297
ELECTRIC SHAVER CUTTER AND SHEAR PLATE COMBINATION
WITH SKIN SCRAPING PREVENTION
Filed March 21, 1963 2 Sheets-Sheet 1

GERRIT STARRE INVENTORS
ARIE FRANSEN
HENRICUS J. DRIESSEN
BY

AGENT

United States Patent Office 3,191,297
Patented June 29, 1965

3,191,297
ELECTRIC SHAVER CUTTER AND SHEAR PLATE COMBINATION WITH SKIN SCRAPING PREVENTION
Gerrit Starre, Arie Fransen, and Henricus Josef Driessen, Drachten, Netherlands, assignors to North American Philips Company, Inc., New York, N.Y., a corporation of Delaware
Filed Mar. 21, 1963, Ser. No. 266,911
Claims priority, application Netherlands, Apr. 13, 1962, 277,237
5 Claims. (Cl. 30—43.6)

The invention relates to a shaving head for use in a dry shaving apparatus having a shear plate provided with apertures traversed by a movable, U-shaped cutting member.

A conventional shaving head of this kind is the blade shaving head in which U-shaped cutters are arranged in a rim on a rotatable support and are located in a groove of a shaving head.

A problem arises from the choice of the thickness of the material of the lamination with a view to the width of the gaps.

A thin or locally thinned shear plate has the advantage that the skin can penetrate further into the gaps or apertures so that a comparatively large part enters the range of the cutters and the beard is cut more closely to the root.

However, this gives rise to a further problem in that the part of the skin penetrating through the gaps comes into such close contact with the cutting edges that a pinching and scraping effect is produced, particularly on a sensitive skin.

The invention has for its object to mitigate this disadvantage and is characterized in that the cutting edges of the cutters are movable adjacent to the undersurfaces of the apertured shear plate. In addition, the face of the cutting member oriented toward the undersurface of the shear plate includes a portion ascending upwardly toward the rear of the cutting member taken in the direction of movement thereof and being at an angle of 15° to the plane of the shear plate. The aforesaid portion terminates in a face that is substantially parallel to and adapted to engage the undersurface of the shear plate.

This has the effect that the obliquely ascending, "leading" face of the cutting member urges back the skin and any thin, "sagging" part of the shear plate before the hairs are cut off. The requirement that the skin should penetrate to a sufficient extent at the cutting area through the gaps or apertures of the shear plate can thus be fulfilled by a suitable choice of the thickness of the plate and of the dimensions of the gaps or apertures; it is found that the scraping effect is completely eliminated.

It is a further important advantage that this result is obtained independently of the specific skin structure of individual users and that the new shaving head is better suitable than those hitherto known for meeting the requirements of users having a fairly great sensitivity to skin scraping and exerting a fairly heavy pressure on the face during the shaving operation.

The free end of the ascending face terminates via a rounded-off part in the front face of the cutting member, i.e. in the case of a U-shaped cutting member, the front face thereof, whereas the rear end of this ascending face preferably terminates by a sharp edge in the portion engaging the shear plate in order to avoid, at any rate, a first contact of the skin with a sharp edge and to ensure a satisfactory cutting effect. The latter effect may be considerably furthered in an embodiment in which a lateral boundary of the ascending face extends obliquely to the direction of movement at an angle of less than 45° thereto and terminates near the end of the ascending face in a cutting edge substantially at right angles to the direction of movement. Particularly long hairs are guided along the bevel face to the last-mentioned cutting edge, where they are cut off.

In an advantageous embodiment this is achieved by providing the face of the cutting member orientated towards the shear plate with a substantially V- or U-shaped incision, bound on each side by an ascending face.

The angle between the ascending face and the shear plate may be about 15° and the angle between the lateral boundary and the direction of movement is about 15°.

Further advantageous features will be described with reference to the embodiment sketched in the drawing.

Figure 1:
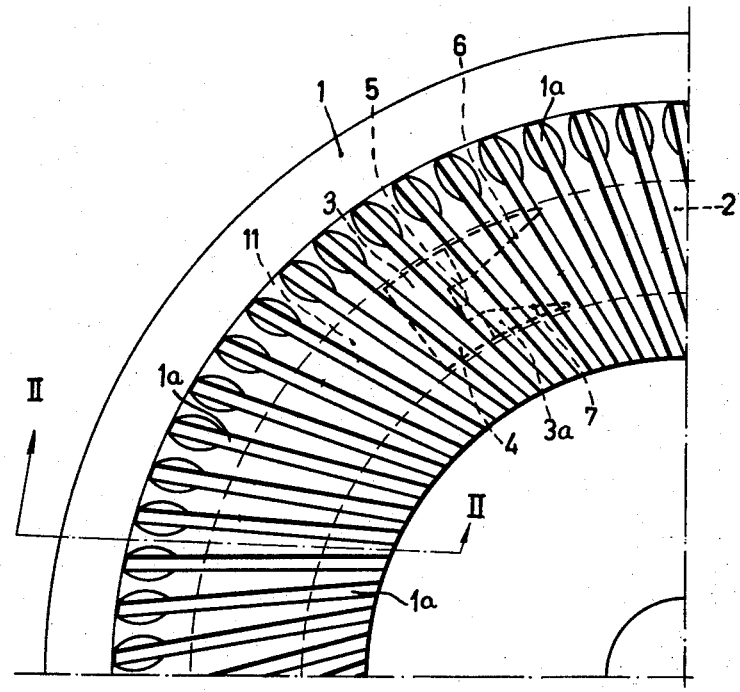
FIG. 1 is a plan view of part of a blade shaving head in which moreover the end face of a movable cutting member according to the invention i.e. of one of the chisels arranged in a crown on a rotatable support (not shown).
Figure 2:
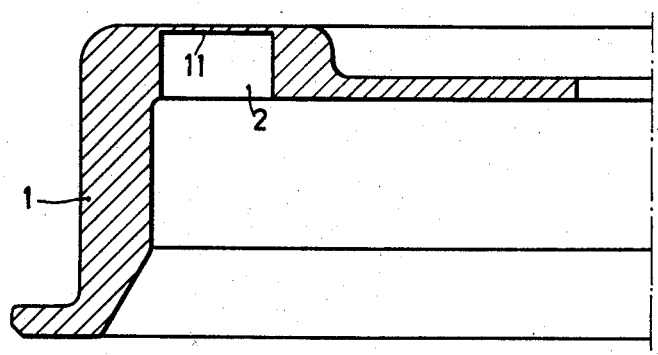
FIG. 2 is a sectional view taken on the line II—II in FIG. 1, the rotatable cutting member being omitted.
Figure 3:
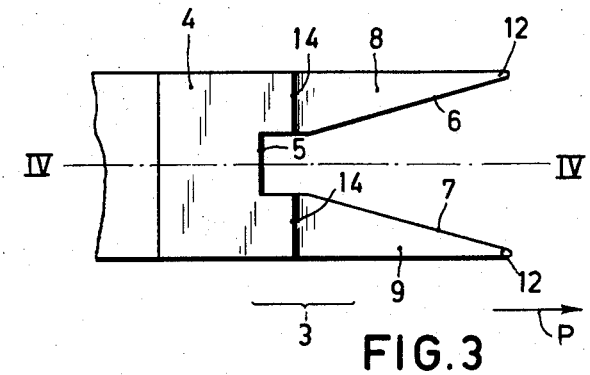
FIG. 3 is a plan view of the face towards the shear plate of the cutting member according to the invention.
Figure 4:
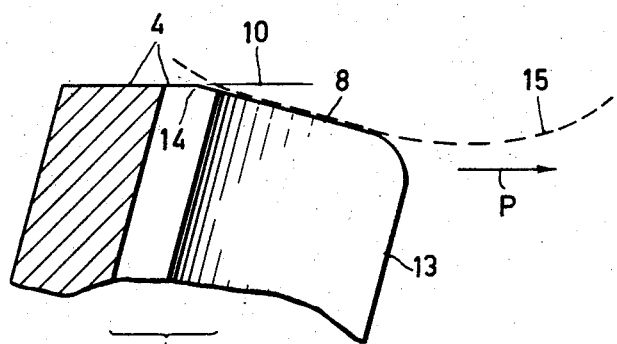

FIG. 4 is a sectional view taken on the line IV—IV of FIG. 3. The blade shaving head comprises in FIG. 1 an apertured shear plate provided with apertures 1a. FIG. 2 shows that the shear plate is provided in a conventional manner with an annular groove 2 accommodating a rotatable cutting member. FIG. 1 shows the upper face 3a of one of the U-shaped cutting members 3, which face engages with its surface 4 the groove 2 of the shear plate 1.

A cutting edge of the cutting member (see also FIGS. 3 and 4) is denoted by 5. The figures show furthermore that this cutting edge terminates on both sides in the lateral boundaries 6 and 7 of ascending faces 8, 9, each including an angle of about 15° to the vertical central plane of the cutting member 3 in the direction of movement. The ascending faces 8, 9, is to the line 10, which indicates the lower edge of the sheer plate 11 (FIGS. 1 and 2) at an angle of 15°. The ends terminate at 12 via a rounded-off part in the front side 13 of the chisel. A part of the skin penetrating through the slot of the lamination into the groove 2 is urged back by the sloping faces 8, 9, rounded off on the front side, before the sharp edges 5, 14 touch the skin.

Such a skin part is indicated in FIG. 4 by the broken line 15. The arrow P indicates the direction of movement of the chisel.

At the instant the cutting edges 5, 14 touch the skin, and a hair is cut off, the skin part concerned will always be pushed back to an extent such that grazing need not be feared, whereas nevertheless the skin has penetrated so that the hair is cut off very narrowly.

What is claimed is:

1. A shaving head for a dry shaver comprising a shear plate provided with a plurality of apertures, a cutting member having the cutting edges thereof adapted to move adjacent to the undersurfaces of said apertures, the face of said cutting member oriented toward the undersurface of said shear plate including a portion ascending upwardly toward the rear of said cutting member taken in the direction of movement thereof, said portion terminating in a face substantially parallel to and adapted to engage said undersurface of said shear plate.

2. A shaving head for a dry shaver as claimed in claim 1 wherein the forward edge of said upwardly ascending portion of said cutting member is rounded off.

3. A shaving head for a dry shaver as claimed in claim 1 wherein the junction between said ascending portion and said adjoining face of the cutting member contains a cutting edge.

4. A shaving head for a dry shaver comprising a shear plate provided with a plurality of apertures, a cutting member having the cutting edges thereof adapted to move adjacent to the undersurfaces of said apertures, the face of said cutting member oriented toward the undersurface of said shear plate including a portion ascending upwardly toward the rear of said cutting member taken in the direction of movement thereof, said portion terminating in a face substantially parallel to and adapted to engage said undersurface of said shear plate, and said ascending portion being at an angle of about 15° to the plane of said shear plate and terminates adjacent to an end of said face in a cutting edge which is substantially at right angles to the direction of movement of said cutting member.

5. A shaving head for a dry shaver comprising a shear plate provided with a plurality of apertures, a U-shaped cutting member having both legs thereof ascending upwardly toward the rear of said cutting member taken in the direction of movement thereof, said cutting member being provided with cutting edges which are adapted to move adjacent to the undersurface of said apertures, said ascending legs terminating in a face substantially parallel to and adapted to engage said undersurface of said shear plate.

References Cited by the Examiner

FOREIGN PATENTS 526,172  9/40  Great Britain.

WILLIAM FELDMAN, *Primary Examiner.*

MYRON C. KRUSE, M. HENSON WOOD, Jr., *Examiners.*